United States Patent [19]

Bynum

[11] Patent Number: 4,495,536
[45] Date of Patent: Jan. 22, 1985

[54] VOLTAGE TRANSIENT PROTECTION CIRCUIT

[75] Inventor: Byron G. Bynum, Tempe, Ariz.

[73] Assignee: Motorola, Inc., Schaumburg, Ill.

[21] Appl. No.: 453,402

[22] Filed: Dec. 27, 1982

[51] Int. Cl.$^3$ ............................................. H02H 3/20
[52] U.S. Cl. ...................................... 361/91; 361/18; 361/101; 361/111; 323/277
[58] Field of Search ...................... 361/18, 91, 93, 98, 361/103, 101, 110, 111; 323/277, 276, 275, 292, 312

[56] References Cited

U.S. PATENT DOCUMENTS

| | | | |
|---|---|---|---|
| 4,254,372 | 3/1981 | Moore, Jr. | 361/18 X |
| 4,319,179 | 3/1982 | Jett, Jr. | 361/18 X |
| 4,319,181 | 3/1982 | Wrathall | 323/277 X |

*Primary Examiner*—Harry E. Moose, Jr.
*Attorney, Agent, or Firm*—Michael D. Bingham

[57] ABSTRACT

A three terminal integrated low-resistant series switch circuit which buffers load electronics from extreme input voltage conditions. The circuit comprises a series pass transistor the conductivity of which is controlled by control circuitry in cooperation with feedback control. In response to the input exceeding a predetermined operating potential the series pass transistor is driven toward saturation and is maintained in this state by feedback whereby only that load current required by the load electronics is supplied for increased efficiency. The control circuitry is responsive to the signal at the input thereof exceeding a predetermined level for rendering the series pass transistor nonconducting to protect the load electronics from extreme voltage excursions. A feature of the circuit is that the epitaxial layer within which the control circuit is formed is operated at a lower voltage than that of the substrate.

21 Claims, 1 Drawing Figure

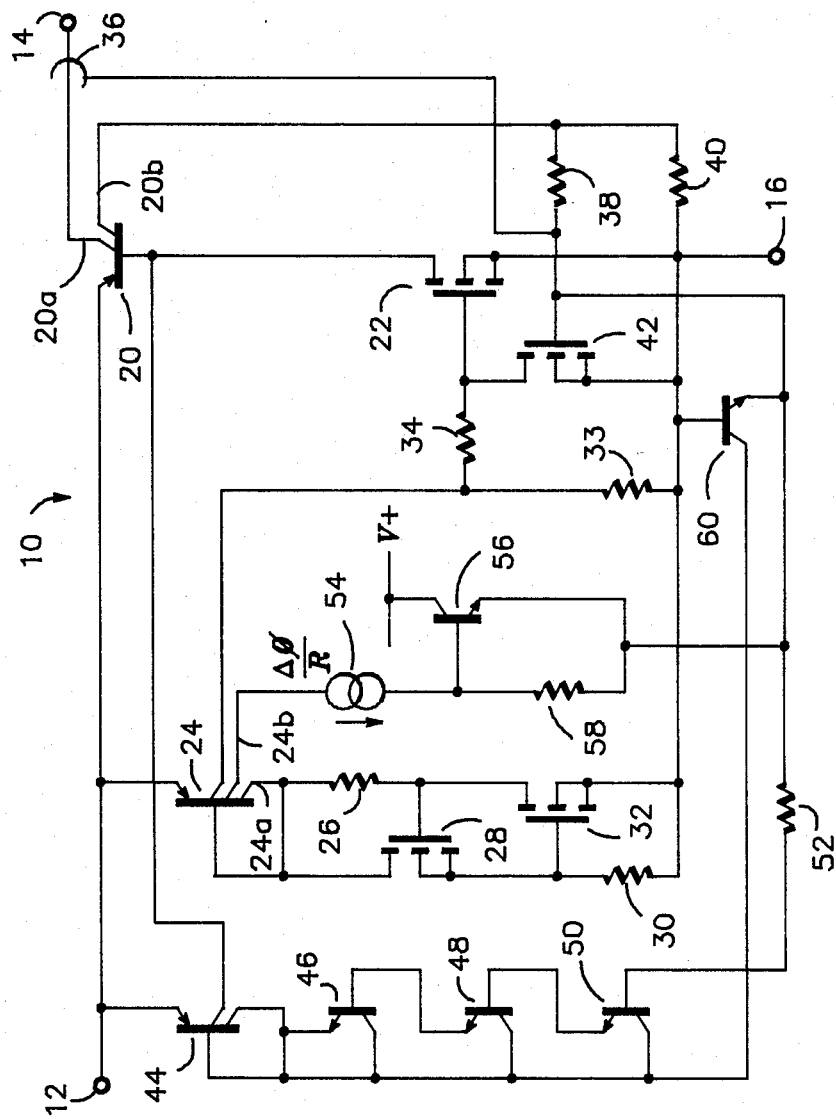

VOLTAGE TRANSIENT PROTECTION CIRCUIT

BACKGROUND OF THE INVENTION

This invention relates generally to a low resistant switch which buffers output circuitry coupled thereto from extreme voltage transients that may occur at the input of the switch. More particularly, the present invention relates to a three terminal integrated low resistance switch circuit suitable for use in an automotive application to protect load electronics coupled therewith from voltage transient that may occur at the input thereof which otherwise could damage or destroy the load electronics.

Any electronic circuit utilized in an automotive system may be subjected to abnormal transients that occur on the battery bus. For example, the nominal battery voltage appearing on the battery bus is +12 volts but under jump start conditions, when two batteries are placed in series, +24 volts may be supplied to the electronics coupled to the battery bus. Another abnormal condition that can occur results from the battery terminals being reversed. Under this condition upwards to −13 volts may be present on the battery bus.

Still another abnormal condition specified by the automotive industry is referred to as voltage load dump wherein it may be possible to have 60 volts occurring on the battery bus. One other condition specified by most automotive manufactures is that all electronics must be able to withstand ±125 volts inductive transients on the battery bus.

Most semiconductor manufacturing processes used today to fabricate monolithic integrated circuits for use in automotive systems can withstand 24 volts applied to the integrated chip. However, in almost all cases, present day solid state electronics cannot stand the 60 volt load dump condition due to breakdown problems as well as power dissipation problems of the integrated chip.

Thus, at least one automotive manufacturer uses a discrete transient protection circuit to protect the load electronics connected thereto from the above described abnormal conditions. This circuit comprises a 100 joule varistor connected from the battery bus to ground, a high current Schottky diode coupled in series between the positive terminal of the battery and the output of the circuit, and a Zener diode connected in series with a diode clamp between the battery bus and ground. The varistor protects the electronics from positive voltage transients while the Zener diode and diode clamp protect the Schottky diode from destructive reverse voltage transients.

Although the above discrete protection circuit functions quite well, the discrete components compromise space, and performance needs. Additionally, the several discrete components are relatively expensive to the automotive manufacturer.

Hence, there is a need for a simple, reliable and rather inexpensive solid state circuit to replace the discrete protection circuit described above.

SUMMARY OF THE INVENTION

Accordingly, it is an object of the present invention to provide an improved low resistance switch.

Another object of the present invention is to provide an improved voltage protection circuit.

Still another object of the present invention is to provide a 3-terminal integrated low resistant switch which buffers load circuitry coupled thereto from otherwise extreme damaging voltage conditions that may occur across the input thereof.

An additional object of the present invention is to provide a low resistance, monolithic integrated switch circuit suited for use in automotive systems to minimize loss of voltage between the input to output thereof while protecting the load connected to the switch from voltage transients that otherwise may damage the same.

Still an additional object is to provide monolithic integrated protection circuit having a series-pass transistor switch having a collector formed by the substrate of the integrated circuit which is normally operated at a potential greater than that of the control circuitry components.

A further object of the present invention is to provide circuitry for controlling the conduction of a transistor switch, which circuitry is operated with all epitaxial regions biased at a voltage substantially equal to the input voltage applied to the transistor switch.

In accordance with the above and other objects there is provided a monolithic integrated voltage transient protection circuit comprising a series pass transistor having its main conduction path coupled between the input and output of the circuit and a control electrode to which is coupled control circuitry as well as feedback circuitry wherein the series pass transistor is rendered conductive in response to the input signal appearing at the input exceeding a first threshold and is driven into saturation to supply only that load current that is required by load means connected to the output of the circuit; in response to the signal at the input of the control circuitry exceeding a predetermined value, the series pass transistor is rendered nonconductive to protect the load means from extreme voltage excursions.

DESCRIPTION OF THE DRAWING

The single FIGURE is a schematic illustrating the voltage protection circuit of the present invention.

DETAILED DESCRIPTION OF THE INVENTION

Turning to the FIGURE there is shown protection circuit 10 of the present invention which is suited to be manufactured in monolithic integrated circuit form using known process techniques. Protection circuit 10 is a three terminal circuit including input terminal 12, output terminal 14 and common terminal 16. Protection circuit 10 may be packaged in a standard, three-terminal TO-220 power package.

A series-pass PNP transistor or electronic control device 20 has its emitter and collector path comprising collector 20a coupled between input and output terminals 12 and 14 respectively. As will hereafter be discussed, in response to an external signal being applied across terminals 12 and 16, transistor 20 provides a low resistance path to supply an output signal between output terminal 14 and common terminal 16 to drive load circuitry which would be coupled thereacross.

The conduction of series-pass switch transistor 20 is controlled by a control circuit comprising DMOS FIELD EFFECT TRANSISTOR (FET) 22 which has its source-drain path coupled between the base of transistor 20 and common terminal 16. As the magnitude of the externally applied signal exceeds a low threshold value, which forward biases PNP transistor 24, current flows from collector 24a through resistor 26 which pulls up the gate of DMOS FET 28 thereby rendering it conductive. FET 28 provides a current path via its source-drain for current to flow from the base of transistor 24 through resistor 30 to common terminal 16. The gate of NMOS FET 32 therefore is forward biased rendering this FET conductive thereby providing a feedback action to the gate of FET 28. This causes collector 24a to be regulated to source a current of value equal to the threshold potential value of FET 32 divided by the magnitude of resistor 30, plus a small current through resistor 26. Collector 24c of transistor 24 mirrors this current to provide a source of current through resistor 33 that causes FET 22 to become conductive as a positive potential is applied, via resistor 34, to the gate of the transistor. Transistor 20 is thus rendered conductive as a base conduction path is thereby provided.

As the externally applied signal increases beyond the aforementioned threshold value, transistor 20 is driven hard toward saturation independent of any load connected across terminals 14 and 16. As will be later explained the structure of transistor 20, comprising collector 20a is such that a low input-to-output voltage drop occurs across the emitter and collector wherein the voltage developed at output terminal 14 is substantially equal to the magnitude of the applied external signal. Hence, as the applied signal increases beyond the aforementioned threshold value, transistor 20 is driven into saturation and the current is regulated by the control circuit to only that base value necessary to supply only that current required by the load electronics coupled to output terminal 14. The current through transistor 20 is regulated by controlling the conduction of FET 22. By reducing the flow of current through FET 22, transistor 20 is rendered less conductive and visa-versa.

Several mechanisms are provided for regulating the current through transistor 20. An important aspect of the present invention is the efficiency of the protection circuit, i.e., the amount of base current required versus the output current supplied at output terminal 14. For maximum efficiency, only enough base current should be sourced from transistor 20, through FET 22, as is required by the load. To insure maximum efficiency a saturation sense and shut down feedback path is provided which senses when transistor 20 goes into saturation. Current is sourced via the feedback path that includes sense collector 36, resistors 38 and 40, to terminal 16 as transistor 20 becomes saturated. This feedback path forward biases the gate-source of NMOS FET 42. FET 42 is therefore rendered conductive to pull the gate of transistor 22 down thereby reducing base current drive to transistor 20 to only that value required to maintain saturation of transistor 20 at the required load current.

Transistor 20, comprising collector 20a, is a vertical PNP structure, i.e., the collector 20a is formed by a portion of the P-type substrate of the integrated circuit. The base of transistor 20 is formed by the epitaxial region which is formed on the substrate and the emitter is formed by a P-type region that may be diffused into the epitaxial layer as understood. The saturation sense feedback path is nominally formed by a transistor which would have its emitter formed by the substrate, its base formed by the epitaxial layer common with transistor 20 and a collector region formed by a separate P-type region. The feedback current is collected by sense collector 36 of the saturation sense transistor as the substrate-epitaxial junction of the integrated circuit is forward biased by transistor 20 becoming saturated.

In view of the above, it should be noted that in typical operation, the substrate (collector 20a of transistor 20) is operated at a greater potential than the control circuitry. This is not generally the case as typically the substrate of a bipolar integrated circuit is maintained at the most negative potential.

Protection circuit 10 also provides short circuit current protection to limit the output current sourced at terminal 14 to a predetermined maximum value. The output current is continually monitored via collector 20b. Collector 20b is laterally formed with respect to the emitter-base regions of transistor 20. The current source through collector 20b flows through resistor 40 to ground reference through terminal 16. If a short condition occurs, the currents flowing through collectors 20a and 20b will increase proportionally until a value is reached at which the voltage drop across resistor 40 is sufficient to render transistor 42 conductive. This condition will forward bias FET 42 to reduce base current drive to transistor 20 flowing through FET 22 as this device is rendered less conductive. Thus, the current sourced by series-pass transistor 20 to terminal 14 can only increase to a maximum value which thereafter remains constant.

Over voltage protection is provided by circuitry comprising multi-collector transistor 44 and series-connected Zener diodes 46, 48 and 50 and resistor 52. If the voltage applied at input terminal 12 exceeds a predetermined value, for example, +28 volts, the combined breakdown voltage of the Zener diodes is exceeded. This condition produces a voltage at the gate of transistor 42 to render it conductive thereby rendering FET 22 nonconductive. This action inhibits base drive to transistor 20. Hence, positive voltage transients that exceed a predetermined value (set by the Zener breakdown voltages of the Zener diodes) are buffered from appearing at output terminal 14.

Protection circuit 10 also includes a thermal shut-down circuit for turning off transistor 20 when the power consumption and/or ambient temperature of the integrated chip exceeds a predetermined temperature value. Thus, if the ambient termperature plus the temperature of the integrated circuit, due to power consumption, exceeds this predetermined temperature, transistor 20 is shut down to protect both the protection circuit and the load electronics connected therewith. Thermal shut-down is provided by current source 54, transistor 56 and resistor 58.

Current source 54 generates a positive temperature coefficient (TC) current utilizing any known $\Delta V_{BE}/R$ current generating circuit. The positive TC current is sourced through resistor 58 to common terminal 16. Hence, a voltage is developed across resistor 58 which has a predetermined positive temperature coefficient as understood. As the temperature of the chip increases, the voltage developed across resistor 58 increases while the VBE threshold voltage of transistor 56 decreases. At the predetermined temperature transistor 56 will be turned on to pull up the gate of FET 42. This causes both transistors 22 and 20 to regulate the circuit power dissipation and, in turn, limit the chip temperature to a nondestructive value.

Zener diode 60 is coupled between the gate of FET 42 and common terminal 16 to provide gate protection by clamping the gate at a predetermined voltage. Thus, diode 60 is rendered conductive as the voltage at the gate of transistor 42 reaches the break-down voltage of the Zener, due to a high potential appearing at input 12, to shunt excess current supplied through Zener diodes 46–50.

Negative voltage transient protection is provided by, in every case, having a PN junction connected to input terminal 12, i.e., the emitters of transistors 20, 24, and 44. The emitter-base junction of these transistors exhibit a high reverse voltage break-down characteristic to buffer the output terminal 14 from any negative voltage transients that may appear at input terminal 12.

An additional feature incorporated into protection circuit 10 is the extension of the reverse break-down voltage ($BV_{ceo}$) of transistor 20 during high positive transient input voltages appearing at input terminal 12. The additional collector of transistor 44 that is tied to the base of transistor 20 supplies any leakage current from the base-to-collector of transistor 20 when transistor 44 is rendered conductive. Thus, any high input voltage condition that essentially cause the base of transistor 20 to be open-circuited due to transistor 22 being rendered non-conductive allows transistor 44 to provide the leakage current drawn by transistor 20.

Typically, protection circuit 10 buffers the load electronics from abnormal voltage transients by causing one of the above described mechanisms to shut down transistor 20 by open circuiting the base-electrode thereto. Under normal operating conditions transistor 20 operates as a low resistance switch that is caused to be opened, to disconnect the load electronics from the input, under high input voltage conditions.

It is recognized that in todays microprocessor controlled automotive systems that series-pass transistor 20 could be opened, or turned off, anytime by a suitable control signal from the microprocessor to render transistor 22 nonconductive by causing the gate of transistor 42 to go positive. In this manner, increased functionality of protection circuit 10 is possible which would require a single additional control pin coupled to the gate of transistor 42.

Still further, it is deemed well within the skill of one in the art in view of the above described protection circuit to implement additional functional elements on the same IC chip such as a regulated standby voltage supply drive memory circuits that may be included on the chip with the protection circuit.

Additionally, it is also deemed within the skills of one familiar to the art in view of the teachings of the present invention to implement circuitry for controlling the series pass transistor in the linear (non-saturated) mode to provide output voltage or current regulation.

In summary, several key features are provided by protection circuit 10 of the present invention. The integrated protection circuit can withstand ±125 volt transients appearing at the input thereof while buffering the load electronics therefrom. Additionally, the protection circuit exhibits an extremely low input-to-output voltage drop thereacross such that the output voltage nearly tracks the input voltage up to a predetermined value after which the output becomes open-circuited. Another novel feature of the present invention is, due to the vertical structure of the switching series-pass transistor 20, the substrate (collector of transistor 20) is operated at a voltage level greater than the epitaxial layer within which the control circuitry is formed. Moreover, the use of the vertical PNP structure provides several advantages among which is the severe reduction in die size required to fabricate the protection circuit. Further, the vertical PNP structure increases the efficiency of the protection circuit since a higher beta is realized that produces a much lower stand-by current.

An aspect of the present invention is the combination of bipolar process technology with MOS process technology on a single integrated chip wherein the DMOS controlling circuitry is operated at a lower potential than the collector of the vertical PNP series pass device. The use of DMOS is required to withstand the high positive voltage excursion that may opccur at the input of the protection circuit which standard bipolar devices could not withstand.

I claim:

1. A monolithic integrated protection circuit for providing protection to a load coupled thereto, comprising:
   a series-pass transistor having first and second main electrodes coupled between an input and an output of the protection circuit and a control electrode;
   control circuit means coupled to said control electrode of said series-pass transistor which is responsive to an external signal applied to an input thereof exceeding a threshold value for rendering said series-pass transistor conductive; and
   feedback circuit means responsive to said series-pass transistor being driven into saturation for providing a feedback control signal to said control circuit means to cause said series-pass transistor to supply the required load current to said output of the protection circuit while minimizing current drive to said control electrode.

2. The protection circuit of claim 1 including protection circuit means responsive to the voltage appearing at said input of the protection circuit exceeding a predetermined value for causing said control circuit means to render said series-pass transistor nonconducting.

3. The protection circuit of claim 1 or 2 including thermal control circuit means responsive to the ambient temperature of the integrated circuit exceeding a predetermined temperature for causing said control circuit means to render said series-pass transistor nonconducting.

4. The circuit of claim 3 including short-circuit protection means responsive to said load current exceeding a threshold value for causing said control circuit means to limit said load current at substantially said threshold value.

5. The circuit of claim 4 wherein said control circuit means includes a first field effect transistor (FET) having a gate electrode and source and drain electrode, said source and drain electrodes being connected in series with said control electrode of said series-pass transistor, said gate being coupled to a control input of said control circuit means.

6. The circuit of claim 5 wherein said control circuit means includes:
   a first transistor having an emitter, a base and multi-collectors, said emitter being coupled to said input of the protection circuit;
   latch circuit means coupled between said base and a first collector of said first transistor for regulating the current flow through said first collector to a predetermined value; and
   first circuit means coupling a second collector of said first transistor with the gate of said first FET such that said first FET is rendered conductive as said first transistor is rendered conductive.

7. The circuit of claim 6 wherein said control circuit means includes a second FET having a source-drain path connected between said gate of said first FET and a common terminal, and a gate connected to said control input, and resistive divider means connected between said control input and said common terminal.

8. The circuit of claim 6 wherein said feedback circuit means comprises a region of semiconductor material of like conductivity type as said second main electrode of said series-pass transistor formed in said epitaxial layer in proximity to said series-pass transistor, said region being coupled to said control input of said control circuit means.

9. The circuit of claim 6 wherein said protection circuit includes:
   a second transistor having an emitter coupled to said input of the protection circuit, and a base and collector interconnected at a first common node; and
   Zener diode means coupled between said common node and said control input terminal of said control circuit means.

10. The circuit of claim 9 wherein said second transistor includes a second collector connected to said control electrode said series-pass transistor.

11. The circuit of claim 7 wherein said latch circuit means includes:
   a third FET having a gate, the source-drain path thereof being coupled in series between said base of said first transistor and a common node;
   a fourth FET having a gate coupled to said common node and a source-drain path coupled between said gate of said third FET and said common terminal;
   second circuit means connecting said gate of said third FET to said first collector of said first transistor; and
   third circuit means coupled between said common node and said common terminal.

12. A monolithic integrated circuit having an input and an output, comprising:
   a vertical structured PNP transistor having an emitter and collector coupled respectively to the input and output of the circuit and a base, said collector being formed by a portion of the substrate comprising the integrated circuit, said base being formed by a region of the epitaxial layer of the integrated circuit and said emitter being formed in a region of said epitaxial layer;
   control circuit means formed in said epitaxial layer which is responsive to an external signal applied to the input of the integrated circuit for controlling the conduction of said PNP transistor wherein said PNP transistor tends to be driven into saturation; and
   sense circuit means for sensing when said PNP transistor is driven into saturation for providing a feedback control signal to an input of said control circuit means to minimize the base current drive of said PNP transistor with respect to the collector current whereby said substrate is maintained at a more positive potential than said epitaxial layer.

13. The circuit of claim 12 including protection circuit means coupled between the input of the circuit and said input of said control circuit means for providing a control signal thereto in response to said external signal exceeding a predetermined value such that said PNP transistor is rendered nonconductive.

14. The circuit of claim 13 including short circuit protection means coupled to said input of said control circuit means which is responsive to said collector current of said PNP transistor exceeding a predetermined value for providing a control signal to said control circuit means to regulate said collector current at substantially said predetermined value.

15. The circuit of claim 13 or 14 wherein said sense circuit means comprises a region of semiconductor material of like conductivity as said emitter region of said PNP transistor in close proximity to said PNP transistor.

16. The circuit of claim 15 wherein said control circuit means:
   includes a first field effect transistor (FET) having a gate, source and drain electrodes, said source-drain electrodes being coupled in series between said base of said PNP transistor and a common terminal of the circuit;
   a first transistor of like conductivity type as said PNP transistor having an emitter coupled to the input of the circuit, a base, first and second collectors;
   latch circuit means coupled between said base and first collector of said first transistor to said common terminal for regulating the collector current sourced from said first collector; and
   first circuit means for coupling said second collector of said first transistor with said gate of said first FET.

17. The circuit of claim 16 wherein said control circuit means further includes a second FET having a source-to-drain path coupled in series between said gate of said first FET and said common terminal, the gate thereof being coupled to said input of said control circuit means.

18. The circuit of claim 17 wherein said protection circuit means includes:
   a second transistor having an emitter coupled to the input of the circuit, a base and a collector, said base and collector being interconnected; and
   Zener diode means coupled between said interconnected base and collector of said second transistor and said input of said control circuit means.

19. The circuit of claim 18 wherein said short circuit protection means comprises a second collector region of said PNP transistor formed in lateral spaced relationship to said emitter and base of said PNP transistor, said second collector region being coupled to said input of said control circuit means.

20. The circuit of claim 19 wherein said latch circuit means includes:
   a third FET having a gate and a source-drain path coupled in series between said base of said first transistor and a common node;
   a fourth FET having a gate coupled to said first common node and a source-drain path coupled in series between said base of said first transistor and a common node;
   a fourth FET having a gate coupled to said first common node and a source-drain path coupled between said gate of said third FET and said common terminal.

21. The circuit of claim 20 wherein said second transistor of said protection circuit includes a second collector coupled to said base of said PNP transistor.

* * * * *